United States Patent [19]

Yokogawa et al.

[11] 4,362,061

[45] Dec. 7, 1982

[54] VORTEX SHEDDING FLOW MEASURING DEVICE

[75] Inventors: Shozo Yokogawa; Isamu Ohno; Yoshio Kurita, all of Musashino, Japan

[73] Assignee: Yokogawa Electric Works, Ltd., Tokyo, Japan

[21] Appl. No.: 231,378

[22] Filed: Feb. 4, 1981

[51] Int. Cl.³ ................................................ G01F 1/32

[52] U.S. Cl. .................................................. 73/861.24

[58] Field of Search ........... 73/861.21, 861.22, 861.24, 73/651, 654, 658, 661; 324/61 R

[56] References Cited

U.S. PATENT DOCUMENTS 3,742,347 6/1973 Walton ............................. 324/61 R 3,927,566 12/1975 Zanker ............................ 73/861.22

4,186,599 2/1980 Frick ............................... 73/861.24

*Primary Examiner*—Charles A. Ruehl

*Attorney, Agent, or Firm*—Parmelee, Bollinger & Bramblett

[57] ABSTRACT

A vortex-shedding flow-measuring device in which the flowing velocity of the fluid is determined by measuring the frequency of differential changes of two capacitances formed by an electrode structure and the wall of the vortex-generating body. The electrodes are located in a recess formed in one end of the body and extend in the axial direction of the latter symmetrically with respect to the direction of flow of the fluid, whereby to reduce the effects on the measurement signal of vibration of the pipe or similar noise components.

2 Claims, 10 Drawing Figures

VORTEX SHEDDING FLOW MEASURING DEVICE

BACKGROUND OF THE INVENTION

1. Field of the Invention

The present invention relates to a flow measuring device of the type making use of Karman's vortices. More particularly, this invention relates to a vortex-shedding flow-measuring device wherein the frequency of vortex shedding is sensed by a capacitance detector.

2. Description of the Prior Art

There are many prior art disclosures showing various kinds of vortex-shedding devices for measuring fluid flow rate. In such devices, a bar or other obstacle in the fluid flow path sheds vortices alternately from opposite sides thereof. Such vortex shedding sets up vibrations or oscillations in the vortex generating body, and it is known that the frequency of those vibrations can be measured to provide an indication of the velocity of fluid flow. Devices of the general type are shown in U.S. Pat. No. 3,972,232, where a piezoelectric pickup is used for determining the frequency of vortex shedding. Devices for detecting the vibrations of the obstacle by means of capacitance sensors is disclosed in U.S. Pat. No. 3,927,566, particularly at FIGS. 2 and 3. Still another device is shown, for example, at FIGS. 6 thru 8 of U.S. Pat. No. 4,186,599.

In these known devices, the measurement is made at a high sensitivity because it relies upon the detection of vibration of the body or obstacle. However, in these known devices the measurement can be adversely affected by mechanical vibrations which are transmitted through the pipe.

SUMMARY OF THE INVENTION

An object of the invention is to provide a vortex-shedding flow-measuring device having superior characteristics. Another object of the invention is to provide such a device of rigid construction, providing high resistance to heat and pressure, and excellent sensitivity. A more specific object of the invention is to provide a flow-measuring device of the kind described wherein the effect of vibrations in the flow pipe is significantly reduced.

DESCRIPTION OF THE PREFERRED EMBODIMENTS

Figure 1:
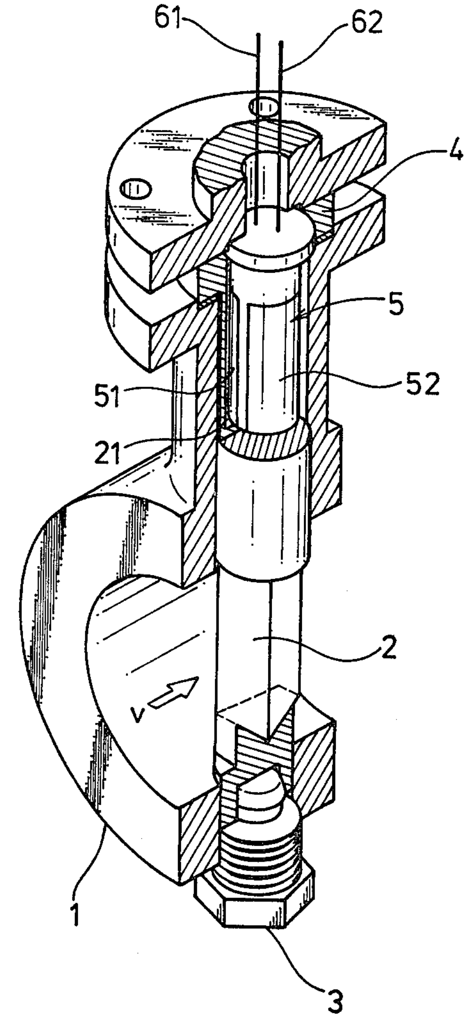
FIG. 1 is a perspective view of an embodiment of the invention, partly in section.

Referring now to FIG. 1, there is shown a flow pipe 1 through which the fluid to be measured flows. Mounted in this pipe is a vortex-shedding obstacle 2 in the form of an elongate vertical bar, e.g. having a trapezoidal cross-section. This bar also includes means for detecting the shedding of the vortices from the side edges thereof.

Figure 2:
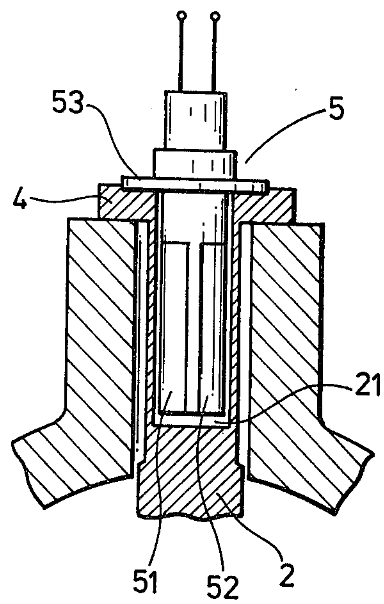
FIG. 2 is a sectional view showing elements of the capacitance sensor of the embodiment shown in FIG. 1.

The lower end of the bar 2 is secured to the pipe by means of a screw 3, while the upper end extends out through the pipe wall and is fixed to a flange 4 as by a screw or weldment (not shown). As shown in FIG. 2, the upper end of the body 2 is provided with an axial recess or cavity 21 formed to receive an electrode structure 5 secured to the outer end of the vortex-generating body. The sides and inner end of this structure 5 are spaced from the wall of the recess by a small distance.

Figure 3:
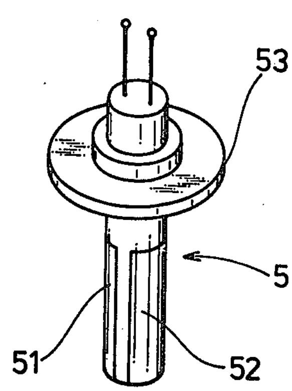
FIG. 3 is a perspective view of an electrode structure incorporated in the embodiment shown in FIG. 1.

Referring also to the perspective view of FIG. 3, the electrode structure 5 comprises a cylindrical member having a flange 53. A pair of electrodes 51, 52 are formed on the surface of the cylindrical member so as to extend axially along the cylinder parallel to one another. The cylindrical member may be formed of, for example, a ceramic which can sustain a high temperature, and the electrodes 51, 52 are formed on this material by spattering, evaporation, printing or the like measure. The surfaces of the electrodes 51, 52 preferably are coated.

Lead wires 61 and 62 are connected to the electrodes 51, 52 and extend through the cylindrical member to the outside, so that they are less affected by heat. The electrodes 51, 52 are disposed symmetrically about an imaginary vertical plane passing through the axis of the pipe 1. Each electrode cooperates with the immediately adjacent wall of the recess 21 to form a corresponding electrical capacitor.

Figure 4:
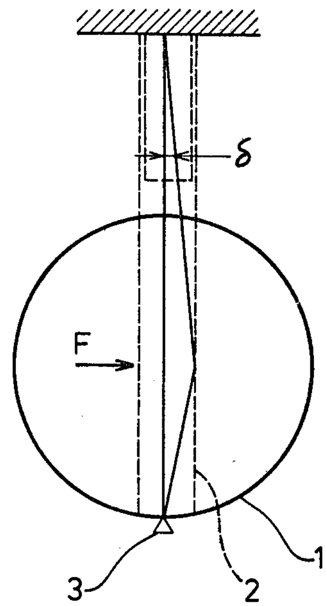
FIG. 4 is a diagram illustrating the operation of the embodiment shown in FIG. 1.

In operation, as the fluid flows through the pipe 1, Karman's vortices are formed at the two sides of the vortex-shedding body 2 alternatingly and regularly. As the vortices are shed, the body is subjected to an alternating fluid dynamic force F directed laterally with respect to the axis of the body, perpendicular to the axis of the pipe. The body 2 thus exhibits a slight displacement as shown in FIG. 4. The magnitude of the displacement $\delta$ depends on various design factors such as the shape of the body 2, the wall thickness of the recess, the supporting arrangement of the body 2, e.g. whether the body is cantilevered or supported at both ends, and so forth.

In practice, a small displacement of the order of 0.02 $\mu$m is effected. As the body 2 is displaced, the side wall of the recess is correspondingly displaced with respect to the surfaces of the electrodes 51, 52 in a direction perpendicular to the direction of the fluid flow. Thus the distances between the side wall and the electrodes 51, 52 are changed, to cause corresponding changes in the electrical capacitances.

Since the electrode structure 5 is received in the recess 21 with the electrodes 51, 52 arranged symmetrically with each other with respect to the flow of the fluid, the capacitance C1 formed between the side wall of the recess and the electrode 51 and the capacitance C2 formed between the side wall of the recess and the electrode 52 vary in a differential manner with changes in the displacement δ of the body 2. That is, as one capacitance increases, the other decreases, so that the capacitance changes are in effect out of phase by 180°. However, the changes of these capacitances due to vibration noises or the like occurring in the same direction as the flow of the fluid are in phase, i.e. the capacitances increase and decrease together.

If the area of each electrode 51, 52 is designated as S, the gap between each electrode and the side wall by d, and the dielectric constant of air by $\epsilon_o$, the capacitance C can be represented by the following equation (1):

$$C=C1=C2=\epsilon_o S/d \qquad (1)$$

Assuming that the vortex generating body 2 is displaced by the Karman's vortices to cause a change of gap represented by Δd, the change of the capacitance can be represented by the following equation (2):

$$\Delta C=-C\cdot\Delta d/d \qquad (2)$$

As a practical example, if the area S of each electrode is 800 $mm^2$ and the gap d is 0.1 mm, the capacitance C would be calculated to be 70 pF. If the displacement of the side wall is 0.02 μm, the change ΔC of the capacitance would be calculated to be $7\times10^{-2}$ pF.

Figure 5:
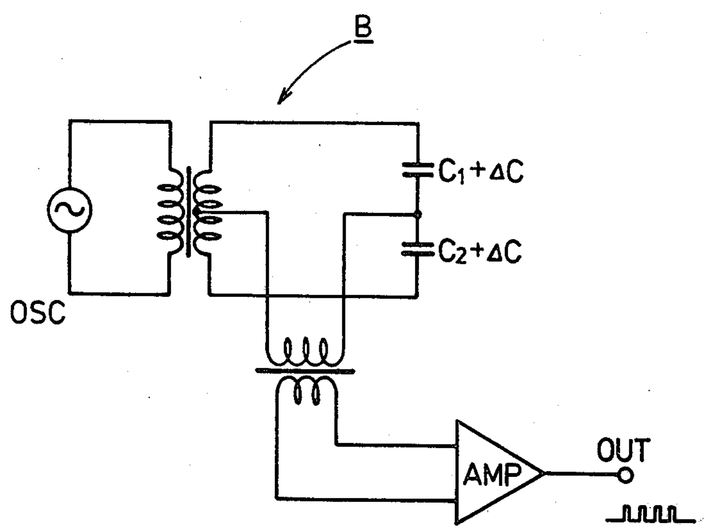
FIG. 5 is a circuit diagram of an electrical bridge for differentially detecting the capacitance changes in a capacitance sensor.

FIG. 5 is a circuit diagram of an exemplary device for detecting the changes of the capacitances between the electrodes 51, 52 and the side wall. The capacitances C1 and C2 are connected to opposing sides of a bridge circuit B, so that the change ΔC of the capacitances is detected in a differential manner. It will be evident that the changes of capacitances due to axial vibrations from noise in the pipe 1 are nullified because these changes are in phase.

In a device having the described construction, the fluid dynamic force F acting on the vortex-generating body 2 is changed into a slight displacement of the wall of the recess 21, and this displacement is detected electrically as a differential change in capacitance so as to obtain pulse signals of a frequency corresponding to the flow velocity of the fluid. The device as a whole has a rigid construction, and in addition, can withstand high temperatures. Nonetheless, such a device can operate at a high sensitivity while avoiding the influences of noise, because it does not use any specific detection element such as a piezoelectric element, strain gauge and so forth. Since the electrode structure is received by the recess, the device can be fabricated easily and the inspection and replacement of the part can be made without substantial difficulty.

In the device shown in FIG. 1, the space between the wall of the recess 21 and the electrode structure 5 may be evacuated or may be filled with an inert gas such as He, Ar or the like. In this case, the oxidation of the electrode structure at high temperatures is avoided, thereby ensuring a higher resistance to heat.

Figure 6:
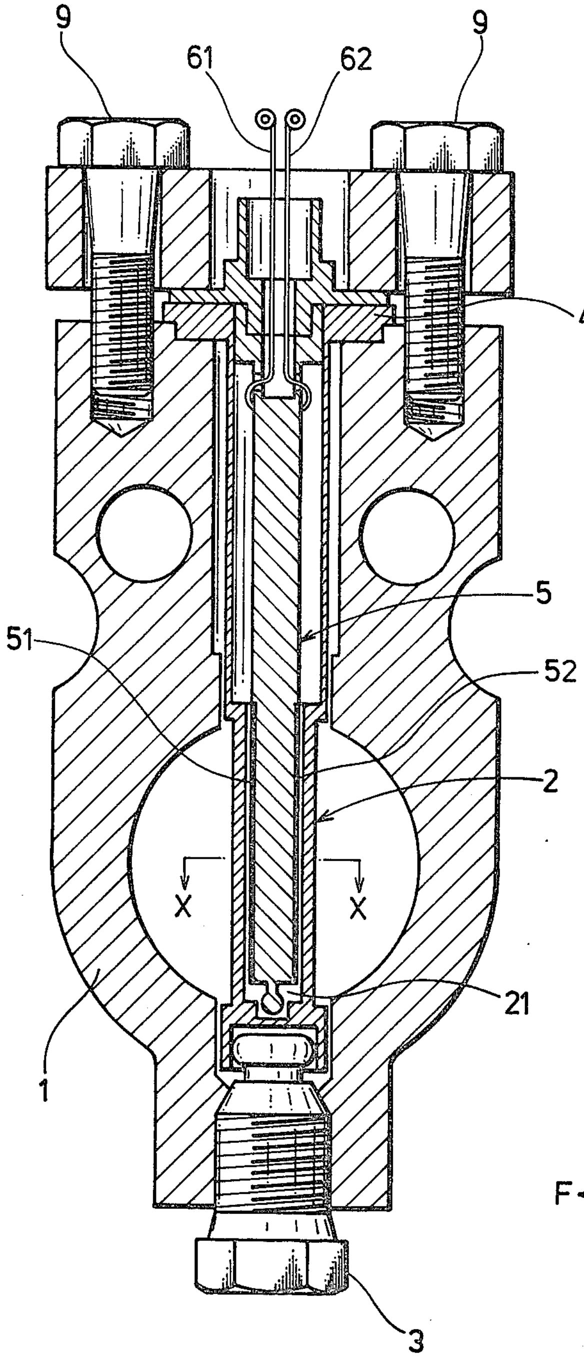
FIG. 6 is a vertical section showing another embodiment of the invention.
Figure 7:
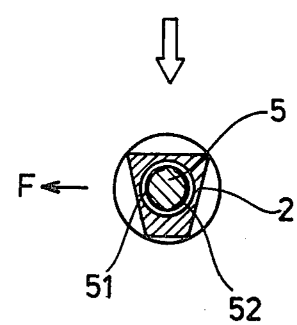
FIG. 7 is a detail horizontal section taken along line X—X of FIG. 6.

In the embodiment of FIGS. 6 and 7, the recess 21 formed at one end of the vortex generating body 2 is extended down towards the other end of the body so that the body is almost hollow. The electrode structure 5 in this case is relatively long, and the electrodes 51, 52 are formed over a substantial length of the structure. This arrangement provides for electrodes 51, 52 of large area, thereby increasing the detection sensitivity.

Although in the preceding embodiments the electrode structure and the recess have circular cross-sections, other configurations can be employed with success, for example, rectangular or other shapes of cross-section can be used.

Figure 8:
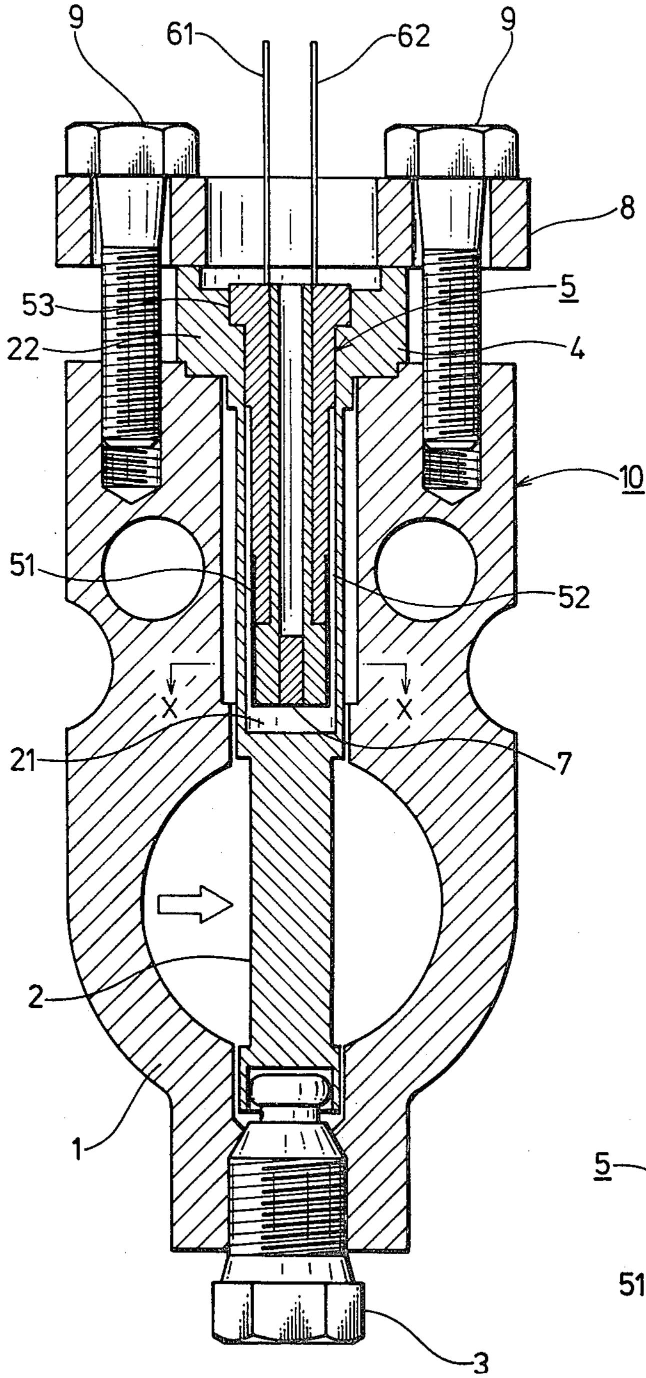
FIG. 8 is a vertical section showing a still further embodiment of the invention.
Figure 9:
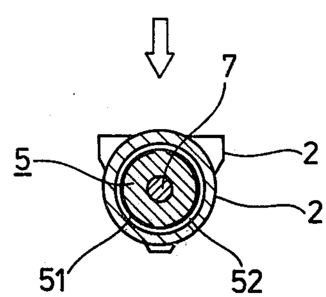
FIG. 9 is a detail horizontal section taken along line X—X of FIG. 8.

Referring now to FIGS. 8 and 9, a mounting portion 10 extends out from the pipe wall perpendicular to the pipe axis. A flange 22 is provided at the upper end of the body 2, and is fixed to the mounting portion 10 by means of screws 9 through a retainer 8. The lower end of the vortex generating member 2 is fixed by means of screw 3 to the pipe wall. It may be noted that, as in the other embodiments, this end of the body need not always be fixed.

The electrode structure 5 is provided at one end with a flange 53 and is received by the recess formed in the vortex generating body 2. The electrode structure 5 is fastened at its flange 53 to the flange 22 of the vortex generating body by, for example, welding.

A weight 7 made of metal or ceramic is received by the hollow space of the electrode structure 5. As will be explained, this weight serves to provide an adjustment of flexural rigidity of the electrode structure.

The alternating lateral fluid dynamic force caused by the shedding of the vortices acts on the columnar portion of the vortex generating body 2 in the pipe 1, so that only the vortex generating body is displaced while the electrode structure 5 takes a neutral position irrespective of the change in that force. Consequently, the capacitances C1 and C2 formed between respective electrodes 51, 52 and the side wall of the recess 21 are changed in a differential manner, so that it is possible to measure the flow velocity or flow rate by counting the frequency of alternations in the capacitances C1, C2.

However, the electrode structure 5 is displaced together with the vortex generating body in response to mechanical vibrations which act perpendicularly to the axis of the pipe.

Figure 10:
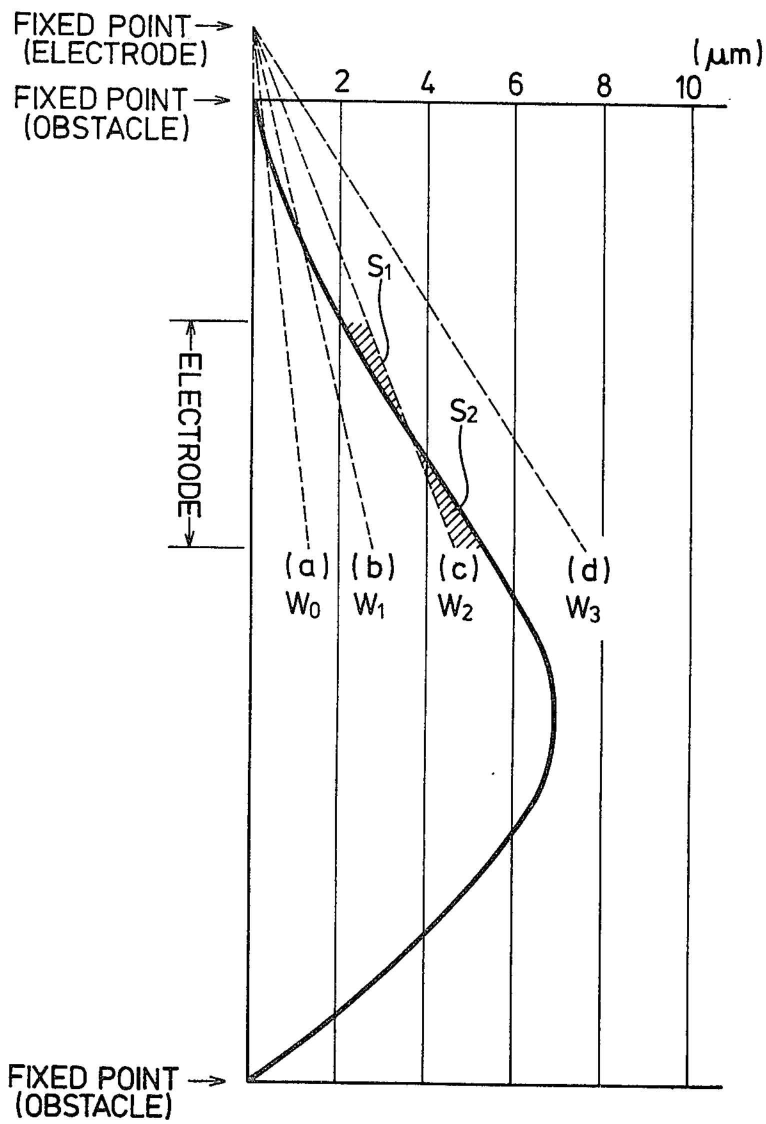
FIG. 10 is a diagram illustrating the deflection of the vortex generating portion and the elemental parts of the electrode structure, in response to the vibration imposed externally on the pipe.

To explain this in more detail, FIG. 10 shows the deflection of the parts of the vortex generating body 2 in a full-line curve and the deflection of the elements of the electrode structure 5 in broken-line curves, as observed when a vibration (e.g. lateral) of an acceleration of 0.2 G is imparted to the pipe 1. The neutral point, i.e. the point at which the deflection is zero, in the vortex generating body 2 differs from that in the electrode structure 5, because of the difference between the respective anchor points. The deflection of the electrode structure 5 can be varied as shown by characteristic curves a, b and c, by changing the weight W of the weight 7.

In this embodiment, the weight W of the weight 7 is so adjusted as to make the deflection of the elements of the electrode structure 5 conform substantially with that of the vortex generating body 2, in response to vibrations imposed on the pipe, thereby to minimize the displacement of these two components relative to each other. That is, the mass of the electrode structure 5 is chosen and selectively distributed physically, with respect to the length of the structure, so as to achieve such conformity between the movements of the two components.

The elements of the electrode structure 5 are deflected as shown by the characteristic curves a, b, c and d as the weight W of the weight 7 is selected to be 0 g, 3 g, 6 g and 12 g, respectively. The characteristic curve c is selected out of the above-mentioned curve a to d, because this characteristic affords a deflection of the electrode structure 5 substantially conforming with that of the vortex generating body 2 within the region of length of the electrode structure where the electrodes 51, 52 are formed. Since the hatched areas $S_1$ and $S_2$ are substantially equal to each other, the relative displacement between the electrode structure 5 and the vortex generating body 2 is maintained substantially zero when the characteristic c is selected.

The deflection characteristic of the vortex generating body 2 and the electrode structure 5 is expressed by the following formula:

$$M/EI$$

where, M, E and I represent, respectively, the mass, Young's modulus and the second moment of area. That is, the deflection characteristic can be varied by the material, cross-sectional shape and so forth. The material, cross-sectional shape and the like are preferably determined chiefly from the view points of mechanical strength, workability, coefficient of thermal expansion, cost and so forth. Apart from the above, the amount of deflection is preferably determined by the mass M.

By making the deflections of various elements of the electrode structure 5 conform with those of the vortex generating body 2, the mechanical vibration action on the pipe 1 causes the deflections of the vortex generating body 2 and the electrode structure 5 to conform with each other, so that the spacing and, hence, the capacitances C1, C2 between the electrodes 51, 52 and the side wall of the recess 21, are essentially unaffected by the mechanical vibration. Consequently, the flow rate can be measured accurately without being affected by the vibration of the pipe.

As has been described, according to the invention, it is possible to obtain a flow measuring device of a rigid construction having high heat and pressure resistances, and capable of performing a measurement at a high sensitivity while avoiding the influence of various vibratory noises.

Although several specific preferred embodiments of the invention have been described hereinabove in detail, it is desired to stress that this is for the purpose of illustrating the invention, and should not be considered as necessarily limiting of the invention, since it is apparent that those skilled in this art will be able to modify the form of the invention in many ways to meet the requirements of different applications.

We claim:

1. A flow measuring device comprising:

a pipe to carry a fluid to be measured;

an elongate vortex-generating body at least partly disposed in the interior of said pipe;

said vortex-generating body having a recess formed at one end and extending in the axial direction thereof;

an electrode structure having two electrodes and positioned in said recess with the electrodes spaced from the wall thereof and in symmetry with each other with respect to the direction of flow of said fluid;

the mass of said electrode structure being selected and physically distributed with respect to its length to provide that the deflection of the elements of said structure in response to vibrations imposed on said pipe substantially conforms with the deflection of said vortex generating body at least in the region of said electrodes; and means differentially responsive to changes in the capacitances between the wall of said recess and said two electrodes.

2. A flow measuring device as claimed in claim 1, wherein a weight is attached to said electrode structure in a position selectable to produce in response to said pipe vibration a deflection of said electrode structure which conforms with that of said vortex-generating body.

* * * * *